United States Patent
Chen

(10) Patent No.: US 6,885,315 B2
(45) Date of Patent: Apr. 26, 2005

(54) KEYBOARD

(76) Inventor: Peter Chen, 4F, No. 70, Wu-Chuan 1st Rd., Hsin Chuang City, Taipei (TW)

(*) Notice: Subject to any disclaimer, the term of this patent is extended or adjusted under 35 U.S.C. 154(b) by 556 days.

(21) Appl. No.: 10/117,050

(22) Filed: Apr. 8, 2002

(65) Prior Publication Data

US 2003/0189501 A1 Oct. 9, 2003

(51) Int. Cl.⁷ .................................................. G09G 5/00
(52) U.S. Cl. ......................... 341/20; 341/26; 345/168; 345/172
(58) Field of Search ............................. 341/20, 22, 26, 341/23; 345/168, 172

(56) References Cited

U.S. PATENT DOCUMENTS

| | | | | |
|---|---|---|---|---|
| 3,940,758 A | * | 2/1976 | Margolin | 345/169 |
| 5,144,302 A | * | 9/1992 | Carter et al. | 341/20 |
| 5,865,546 A | * | 2/1999 | Ganthier et al. | 400/489 |
| 6,018,335 A | * | 1/2000 | Onley et al. | 345/172 |
| 6,037,928 A | * | 3/2000 | Nachinson et al. | 345/156 |
| 6,114,978 A | * | 9/2000 | Hoag | 341/23 |
| 6,320,519 B1 | * | 11/2001 | Hsu et al. | 341/23 |
| 6,529,145 B1 | * | 3/2003 | Lin | 341/22 |
| 6,727,890 B2 | * | 4/2004 | Andres et al. | 345/168 |

* cited by examiner

Primary Examiner—Albert K Wong

(57) ABSTRACT

A keyboard includes a text key zone and a special function key zone, and the special function key zone is further divided into seven major function zones, namely, mouse editing zone, Internet zone, multimedia play zone, application zone, power management zone, numeric and shortcut keys convert and input zone, and indicator zone. The seven major zones are electrically connected to I/O ports of a microcomputer included in an internal circuit configuration of the keyboard and work with a seventh class code that uses definition E2 as leading code. The keyboard enables different kinds of inputs, so that a user may perform professional and convenient operation or document editing directly under a computer operating system without the need of memorizing and combining multiple keys or using a mouse as an aid.

2 Claims, 2 Drawing Sheets

KEYBOARD

BACKGROUND OF THE INVENTION

The present invention relates to a keyboard having special keys provided thereon, and more particularly to a keyboard that enables a user to perform professional and convenient operation or document editing directly under a computer operating system without the need of memorizing and combining multiple keys or using a mouse as an aid.

With the constantly developed computer-related technologies and applications, new and improved information industrial products are continuously introduced into the markets. However, there is not any significant improvement made to the conventional keyboard (see FIG. 1) for input through manual operation. While powerful functions and easy operation are two major requirements of nowadays apparatus and equipment, most currently available operating systems and document editing programs must be operated and executed via a mouse, with which a user selects a desired function from an option table. The user has to move his or her body to complete input of instructions. This type of operating manner is, of course, laborious and inconvenient for users and tends to cause injured arms and wrists when the users keep using computers in this manner for a prolonged time.

A multimedia keyboard as shown in FIG. 2 has been developed and introduced into the market in an attempt to relieve computer users from the above-mentioned laborious and inconvenient operating manner. This type of multimedia keyboard is formed by incorporating many hot keys providing special functions into a conventional standard keyboard and is driven with specified keyboard driver. A user working under Windows needs only to press these special functional keys to execute corresponding instructions. However, the mouse is still a necessary aid and the user has to move his or her hands and wrists as frequently as before. Therefore, the multimedia keyboard is not so helpful as it is expected to be.

FIG. 3 shows a Windows keyboard developed by some professional keyboard manufacturers. Keys on this type of keyboard are divided into four zones, namely, general text key zone, document editing modular key zone, office application modular key zone, and application programming modular key zone.

In the conventional keyboard technological field, there are six classes of key scan codes for general keyboards. The general text key zone on the Windows keyboard uses the first to the fourth class codes, the document editing modular key zone uses the sixth class code, the application programming modular key zone uses the second class code, and the office application modular key zone uses the sixth class code. The Windows keyboard is not compatible with all types of computer systems and is supported only by a few programs.

The following briefly describes the above-mentioned six classes of key scan codes.

(a) The First Class Code

This class of code includes a MAKE code that is a 1-byte key. When the key is pressed and held, the MAKE code is continuously sent out until the key is released. When the key is released, a BREAK code of F0 (H) is sent out. The BREAK code and the MAKE code have total two bytes. And, the first class code is in the form of XXF0XX.

(b) The Second Class Code

This class of code includes a MAKE code that is a 2-byte key. That is, when another key on the keyboard having the function of the same symbol or a conventional multimedia key having a MAKE code of E0XXH (the MAKE code of the original key is XXH) is continuously pressed, the 2-byte MAKE code will be continuously sent out until the key is released. When the key is released, a 3-byte BREAK code of E0+F0+XX is sent out. And, the second class code is in the form of E0XXE0F0XX.

When a key of the above-mentioned first or second class code is pressed and held, the keyboard will continuously send out MAKE code that is referred to as the "TYPEMATIC". In designing a keyboard controller, it is not necessary every key has the TYPEMATIC function.

(c) The Third Class Code

This class of code includes a PRINT SCREEN key that is a special key. The third class code has a 4-byte MAKE code and a 6-byte BREAK code. When the key is continuously pressed, two bytes (E07C H) will be continuously sent out.

(d) The Fourth Class Code

This class of code includes a PAUSE key that is also a special key having only a MAKE code without any BREAK code. The MAKE code is an 8-byte code.

(e) The Fifth Class Code

This class of code is formed by combining the above four classes of codes with SHIFT, CONTROL, ALT or NUM LOCK and other keys depending on different conditions. Table 1 shows some examples of such key combinations.

TABLE 1

| Key | Base Case, or Shift + Num Lock Make/Break | Shift Case Make/Break | Num Lock Make/Break |
|---|---|---|---|
| INS | E0 70/E0 F0 70 | E0 F0 12 E0 70/ E0 F0 70 E0 12 | E0 12 E0 70/ E0 F0 70 E0 F0 12 |
| DEL | E0 71/E0 F0 71 | E0 F0 12 E0 71/ E0 F0 71 E0 12 | E0 12 E0 71/ E0 F0 71 E0 F0 12 |
| LEFT | E0 6B/E0 F0 6B | E0 F0 12 E0 6B/ E0 F0 6B E0 12 | E0 12 E0 6B/ E0 F0 6B E0 F0 12 |
| HOME | E0 6C/E0 F0 6C | E0 F0 12 E0 6C/ E0 F0 6C E0 12 | E0 12 E0 6C/ E0 F0 6C E0 F0 12 |
| END | E0 69/E0 F0 69 | E0 F0 12 E0 69/ E0 F0 69 E0 12 | E0 12 E0 69/ E0 F0 69 E0 F0 12 |
| UP | | E0 F0 12 E0 75/ E0 F0 75 E0 12 | E0 12 E0 75/ E0 F0 75 E0 F0 12 |
| DOWN | | E0 F0 12 E0 72/ E0 F0 72 E0 12 | E0 12 E0 72/ E0 F0 72 E0 F0 12 |
| PAGE UP | | E0 F0 12 E0 7D/ E0 F0 7D E0 12 | E0 12 E0 7D/ E0 F0 7D E0 F0 12 |
| PAGE DOWN | E0 7A/E0 F0 71 | E0 F0 12 E0 7A/ E0 F0 7A E0 12 | E0 12 E0 7A/ E0 F0 7A E0 F0 12 |
| RIGHT | E0 74/E0 F0 74 | E0 F0 12 E0 74/ E0 F0 7A E0 12 | E0 12 E0 74/ E0 F0 74 E0 F0 12 |

| Key | Scan Code Make/Break | Shift Case Make/Break | |
|---|---|---|---|
| (/) | E0 4A/E0 F0 4A | E0 F0 12 E0 4A/E0 F0 4A E0 12 | |

| Key | Scan Code Make/Bread | Ctrl Case, Shift Case Make/Break | Alt Case Make/Break |
|---|---|---|---|
| PRINT | E0 12 E0 7C/ 7C E0 F0 12 | E0 7C/E0 F0 7C | 84/F0 84 |

| Key | Make Code | | Ctrl Key Pressed |
|---|---|---|---|
| PAUSE | E1 14 77 E1 F0 14 F0 77 | | E0 7E E0 F0 7E |

(f) The Sixth Class Code

This class of code is a variant of the fifth class code. The code is sent out in the sequence shown in Table 2. For example, when the redo key in Table 2 is pressed, a corresponding key combination will be sent out.

TABLE 2

| Function | Key Combinations |
| --- | --- |
| Redo | Alt + E, R; or Alt + Enter; or Alt + Shift + Backspace |
| Undo | Alt + E, U; or Alt + Backspace |
| Open | Alt + F, O; Ctrl + O; Ctrl + F12; or Alt + Ctrl + F2 |
| New | Alt + F, N; or Ctrl + N |
| Bold | Ctrl + B; or Ctrl + Shift + B |
| Save | Alt + F, S; Ctrl + S; Shift + F12; or Alt + Shift + F2 |
| Take pane | Alt + E, K |
| Fwd | Ctrl + F |
| Reply | Ctrl + R |
| Sent | Alt + S; or Ctrl + Enter |
| Bullets and Number | Alt + O, N |
| Replace | Alt + E, E |
| Application switch | Alt + Shift + Tab; or Alt + Tab |
| Close application | Alt + F4; or Ctrl + W |
| Log off | WIN, L |
| Cut | Alt + E, T; Ctrl + X; or Shift + Del |
| Paste | Alt + E, P; Ctrl + V; or Shift + Insert |
| Copy | Alt + E, C; Ctrl + C; or Ctrl + Insert |
| Mark | Shift Mark |

From Table 2, it can be found that the redo key corresponds to the key combinations of Alt+E, R; Alt+Enter; or Alt+shift+Backspace. The sample principle is applicable to other functions. However, there is a big problem with the sixth class code about software compatibility. That is, it is not applicable to all types of computer software or operating systems but can be used on specific software only. If a driver were used to achieve the specified function, the driver would also replace functions that should otherwise be supported by other programs. Therefore, there are still many defects existing in the sixth class code.

SUMMARY OF THE INVENTION

It is therefore a primary object of the present invention to provide a keyboard that uses a seventh class code using definition E2 as leading code and corresponding special keys, so that a user may perform professional and convenient operation or document editing directly under the computer operating system without the need of memorizing and combining multiple keys or using a mouse as an aid.

To achieve the above and other objects, the keyboard of the present invention mainly includes a text key zone and a special function key zone, and the special function key zone is further divided into seven major function zones, namely, mouse editing zone, Internet zone, multimedia play zone, application zone, power management zone, numeric and shortcut keys convert and input zone, and indicator zone. The seven major zones are electrically connected to I/O ports of a microcomputer included in an internal circuit configuration of the keyboard and work with a seventh class code that uses definition E2 as leading code. The keyboard enables different kinds of inputs, so that a user may perform professional and convenient operation or document editing directly under a computer operating system without the need of memorizing and combining multiple keys or using a mouse as an aid.

BRIEF DESCRIPTION OF THE DRAWINGS

The structure and the technical means adopted by the present invention to achieve the above and other objects can be best understood by referring to the following detailed description a of the preferred embodiments and the accompanying drawings, wherein.

DETAILED DESCRIPTION OF THE PREFERRED EMBODIMENTS

Figure 1:
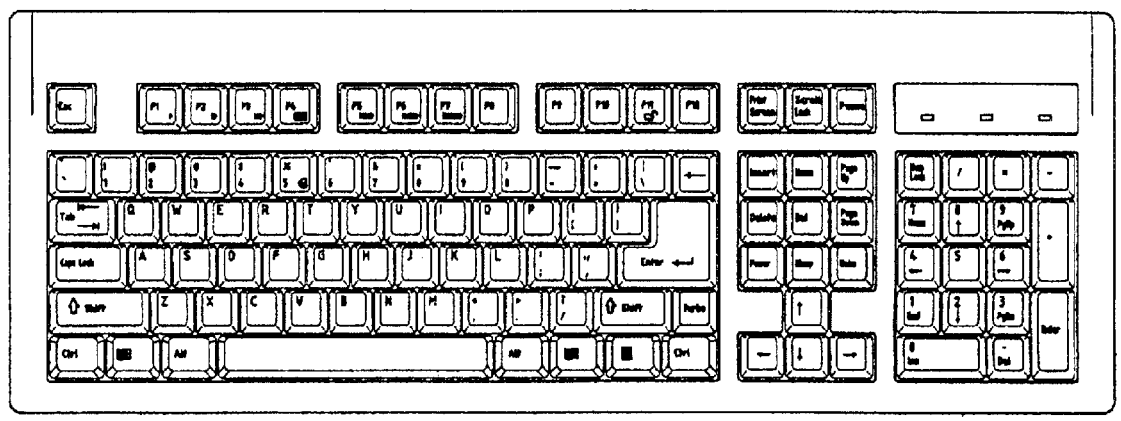
FIG. 1 shows a conventional standard keyboard.
Figure 2:
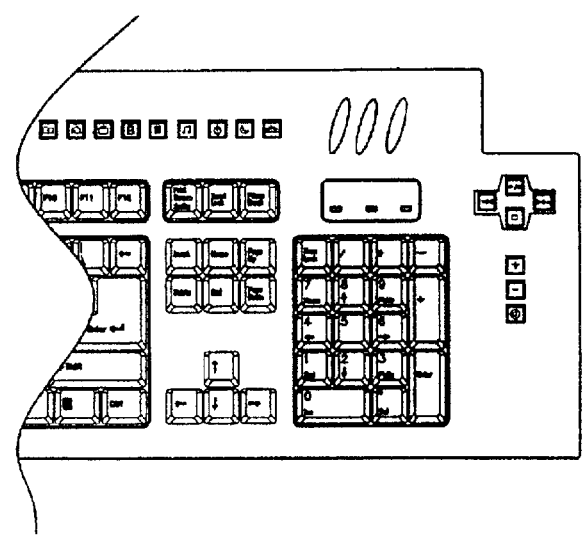
FIG. 2 shows a conventional multimedia keyboard.
Figure 3:
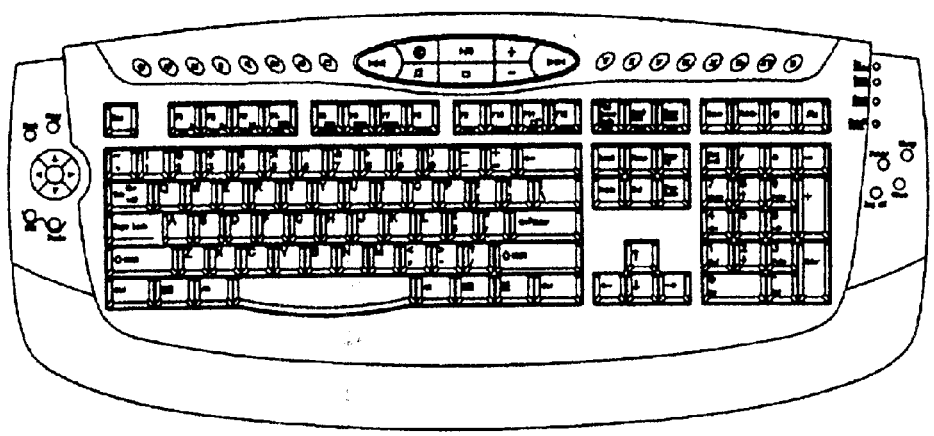
FIG. 3 shows a conventional Windows keyboard.
Figure 4:
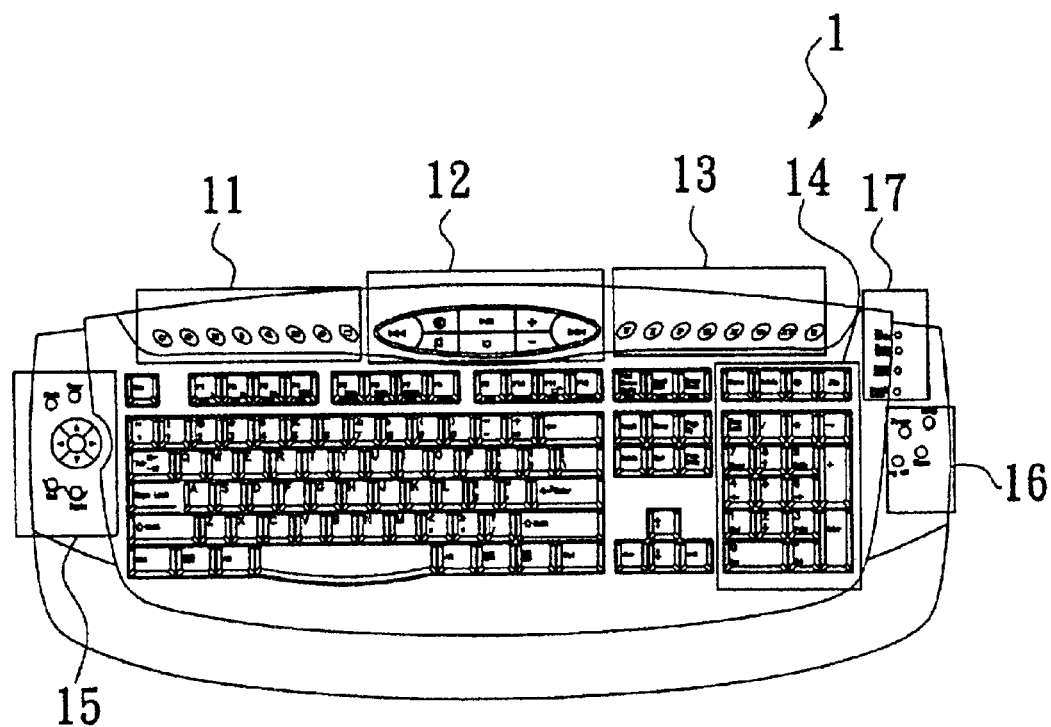
FIG. 4 is a keyboard according to a preferred embodiment of the present invention.

Please refer to FIG. 4 in which a keyboard 1 according to a preferred embodiment of the present invention is shown.

The keyboard 1 is divided into two zones, namely, general text key zone and special function key zone. The special function key zone is further divided into seven major function zones, namely, Internet zone 11, multimedia play zone 12, application zone 13, numeric and shortcut keys convert and input zone 14, mouse edit zone 15, power management zone 16, and indicator zone 17. These zones are connected to I/O ports of a microcomputer included in an internal circuit configuration of the keyboard. A user may directly use these modular keys together with a seventh class code that uses definition E2 as leading code to do input without the need of pressing multiple keys and moving the mouse at the same time. The modular keys included in the above-mentioned seven major function zones may be provided on the keyboard 1 independently or simultaneously.

Among the seven zones, the Internet zone 11, the multimedia play zone 12, the power management zone 16, and the numeric key function of the numeric and shortcut keys convert and input zone 14 work based on the above-mentioned conventional first to fifth class codes. The mouse edit zone 15 uses a manner similar to the conventional fourth class code to send out the code MARK, and has only the MAKE but not the BREAK code. Other keys in the mouse edit zone 15 send out codes via a mouse. The application zone 13 uses the conventional second class code to send codes. The shortcut key function of the numeric and shortcut keys convert and input zone 14 uses the seventh class code of the present invention. With the seventh class code, the keyboard 1 is easily compatible with techniques of prior art and has upgraded keyboard function and faster input speed.

The present invention also provides a driver that converts key codes in accordance with a special key code conversion table, such that the keyboard itself does not need to convert the codes. The code conversion driver used by the present invention is quite different from the conventional hot key driver in the manner in which it works. With the code conversion driver of the present invention, the keyboard itself sends out a code of E2XXE2F0XX and uses a completed kernel program located at a base layer of the operating system as a shortcut key processing function module that must include a designated key intercept and convert program in the form of terminate and stay resident (TSR). For example, when a user works under Windows, he or she would have to press and hold Alt and E and then press R to perform the redo function. However, with the keyboard 1 of the present invention, the user needs only to press one single key to perform the redo function. Some leading codes of the present invention and the corresponding key combinations they simulate for performing specific functions are listed in Table 3.

TABLE 3

| Function | Simulated Key Combinations | Leading code of the present invention |
|---|---|---|
| Redo | Alt + E, R; or Alt + Enter; or Alt + Shift + Backspace | E2 00 E2 F0 00 |
| Undo | Alt + E, U; or Alt + Backspace | E2 01 E2 F0 01 |
| Open | Alt + F, O; Ctrl + O; Ctrl + F12; or Alt + Ctrl + F2 | E2 02 E2 F0 02 |
| New | Alt + F, N; or Ctrl + N | E2 03 E2 F0 03 |
| Bold | Ctrl + B; or Ctrl + shift + B | E2 04 E2 F0 04 |
| Save | Alt + F, S; Ctrl + S; Shift + F12; or Alt + Shift + F2 | E2 05 E2 F0 05 |
| Take pane | Alt + E, K | E2 06 E2 F0 06 |
| Fwd | Ctrl + F | E2 07 E2 F0 07 |
| Reply | Ctrl + R | E2 08 E2 F0 08 |
| Send | Alt + S; or Ctrl + Enter | E2 09 E2 F0 09 |
| Bullets and Number | Alt + O, N | E2 0A E2 F0 0A |
| Replace | Alt + E, E | E2 0B E2 F0 0B |
| Application switch | Alt + Shift + Tab; or Alt + Tab | E2 0C E2 F0 0C |
| Close application | Alt + F4; or Ctrl + W | E2 0D E2 F0 0D |
| Log off | WIN, L | E2 0E E2 F0 0E |
| Cut | Alt + E, T; Ctrl + X; or Shift + Del | E2 0F E2 F0 0F |
| Paste | Alt + E, P; Ctrl + V; or Shift + Insert | E2 10 E2 F0 10 |
| Copy | Alt + E, C; Ctrl + C; or Ctrl + Insert | E2 11 E2 F0 11 |
| Mark | Shift Mark | E2 12 E2 F0 12 |

For example, when performing Chinese/English keyin under MS-DOS, a user would have to press and hold Ctrl while press the Space bar to switch between Chinese and English. However, with the keyboard of the present invention, when a key of E2XXE2F0XX is designated and the designated key intercept and convert program is run, the user can quickly complete the switch with only one single finger. Or, when working under X Window (i.e. Linux), a user may use a completed kernel program located at a base layer of the operating system as a shortcut key processing function module that must include a designated key intercept and convert program in the form of terminate and stay resident (TSR). For example, the user may press a key of E2XXE2F0XX to simulate Ctrl+Alt+F1 and switch a terminal. Or, when working under Windows, a user may use SHELLEXEC ( ) function to call and execute other external programs. For example, pressing of an E-mail key will send out a code of E201E2F001. When the TSR receives the code, it immediately converts the code and uses the SHELLEXEC () function to call "C:\PROGRAM FILES\OUTLOOKEXPRESS\MSIMN.EXE". At this point, the user can send E-mail.

The keyboard 1 of the present invention enables different kinds of inputs, so that a user may perform professional and convenient operation or document editing directly over a computer operating system without the need of memorizing and combining multiple keys or using a mouse as an aid.

The present invention has been described with a preferred embodiment thereof and it is understood that many changes and modifications in the described embodiment can be carried out without departing from the scope and the spirit of the invention as defined by the appended claims.

What is claimed is:

1. A keyboard comprising a text key zone and a special function key zone, and said special function key zone being further divided into seven major function zones, namely, a mouse editing zone, an Internet zone, a multimedia play zone, an application zone, a power management zone, a numeric and shortcut keys convert and input zone, and an indicator zone; said seven major zones being electrically connected to I/O ports of a microcomputer included in an internal circuit configuration of said keyboard and working with a seventh class code that uses definition E2 as leading code, enabling different kinds of inputs to be performed via said keyboard; whereby a user may perform professional and convenient operation or document editing directly under a computer operating system without the need of memorizing and combining multiple keys or using a mouse as an aid.

2. The keyboard as claimed in claim 1, wherein said E2 leading code is a keyboard scan code.

* * * * *